US005183145A

United States Patent [19]

Williams et al.

[11] Patent Number: 5,183,145

[45] Date of Patent: Feb. 2, 1993

[54] APPARATUS AND METHOD FOR AUTOMATICALLY POSITIONING VALVE MEANS CONTROLLING THE APPLICATION OF PRESSURIZED AIR TO MANDRELS ON A ROTATING CARRIER

[75] Inventors: Robert Williams, Randolph; Enn Sirvet, Washington Township, Bergen County; Richard A. Gabel, Livingston, all of N.J.

[73] Assignee: Sequa Corporation, New York, N.Y.

[21] Appl. No.: 775,206

[22] Filed: Oct. 11, 1991

[51] Int. Cl.$^5$ .......................... B65G 47/26; B41F 17/22

[52] U.S. Cl. .......................................... 198/441; 101/40; 198/476.1; 198/487.1; 198/493

[58] Field of Search .......................... 101/40, 40.1, 39; 198/441, 476.1, 487.1, 803.12, 493

[56] References Cited

U.S. PATENT DOCUMENTS 3,469,670 9/1969 Cartwright ........................ 101/40 X
3,613,571 10/1971 Russell et al. ........................ 101/40
3,766,851 10/1973 Sirvet et al. .......................... 101/40

*Primary Examiner*—Clifford D. Crowder

*Attorney, Agent, or Firm*—Mitchell D. Bittman; Jerome M. Berliner

[57] ABSTRACT

A continuous motion cylindrical can decorator is provided with mandrels that receive undecorated cans and a deco chain that carries decorated cans through a curing oven. The mandrels are mounted along the periphery of a continuously rotating carrier. Chain speed is much slower than linear mandrel speed and spacing between pins on the chain is much less than spacing between mandrels. Interposed between the chain and the mandrel carrier is a continuously rotating transfer carrier having a plurality of suction holding devices thereto. As the holding devices move through a transfer region they are in single file and receive cans that are blown from the mandrels. In the transfer region mandrel linear speed is substantially greater than linear speed of the holding devices, and spacing between the latter is much less than spacing between the mandrels. Valving that controls application of pressurized air to unload the mandrels is positioned by a servo such that the valving opens automatically at a more upstream position for the mandrels as mandrel carrier speed increases.

9 Claims, 8 Drawing Sheets

APPARATUS AND METHOD FOR AUTOMATICALLY POSITIONING VALVE MEANS CONTROLLING THE APPLICATION OF PRESSURIZED AIR TO MANDRELS ON A ROTATING CARRIER

BACKGROUND OF THE INVENTION

This invention relates to continuous motion can decorating apparatus in general and relates more particularly to apparatus of this type in which linear mandrel speed and spacing between mandrels greatly exceeds deco chain speed and spacing between pins carried by the deco chain.

Both U.S. Pat. No. 3,766,851, issued Oct. 23, 1973 to E. Sirvet et al. for Continuous Can Printer and Handling Apparatus and U.S. patent application Ser. No. 07/565,695 filed Aug. 13, 1990 by R. DiDonato et al. entitled Mandrel Trip Assembly for Continuous Motion Can Decorator, now U.S. Pat. No. 5,111,742, and assigned to the assignee of the instant invention, disclose relatively high-speed so-called continuous motion can decorating apparatus in which undecorated cylindrical containers mounted on mandrels that are carried by a rotating carrier have decorations applied thereto, have a protective coating of varnish applied over the decorations, and are then delivered to suction holding cups on a rotating transfer wheel from which they are loaded on pins that are carried in a single file arrangement by a so-called deco chain that is moving in a closed loop. The chain path extends through an oven where the pin loaded cans are subjected to heat which acts to cure the materials forming the decorations and their protective coating.

For the most part, in prior art apparatus of this type the mandrels and deco-chain travel generally at the same linear speed and the spacing between mandrels generally equals the spacing between deco chain pins. This type of apparatus has proven to be satisfactory for equipment that decorates the most popular size beverage containers now used in the U.S., the twelve ounce aluminum can having a diameter of 2⅝", which apparatus operates at production rates up to about 2000 cans per minute. For a given density loading of the deco chain, as production rates increase this is accompanied by increased deco chain speed. There comes a point where an increase in oven size and a longer chain are required if oven temperature is to be maintained low enough to prevent excessive heating of the cans. Increasing oven size and chain length requires a substantial increase in capital investment, and increasing chain length will also result in increased maintenance costs and more down time.

One prior art approach to possibly solving this problem is found in U.S. Pat. No. 3,469,670 issued Sep. 30, 1969 to W. J. Cartwright for a Can Transfer Mechanism. In this Cartwright patent deco chain speed is much slower than linear mandrel speed and pin spacing is much less than mandrel spacing. This is achieved by constructing the transfer wheel so that containers are received in single file a the periphery of the rotating transfer wheel and are then moved radially inward to form a single file at a position where the linear speed of the container matches chain speed during loading of the pins which are in single file on the chain. During pin loading the spacing between containers is substantially equal to spacing between pins.

Another approach for solving this same problem is to have the deco chain carry two rows of pins, move containers on the transfer wheel suction cups radially inward to reduce linear container speed to match that of the deco chain, and position the containers on the transfer wheel so that alternate containers are received by one row of pins and the remaining containers are received by the other row of pins. In this arrangement, at unloading of the mandrels, mandrel and suction cup speeds are the same, as are spacing between suction cups and spacing between mandrels. Further, at loading of the chain pins, pin spacing in each row equals spacing between the suction cups, and linear suction cup speed equals chain speed.

SUMMARY OF THE INVENTION

Theoretically the foregoing solutions may be workable, but they do not appear to be practical when size considerations are taken into account, especially when linear mandrel speed far exceeds chain speed. The instant invention solves this problem in a practical way by having linear mandrel speed exceed linear suction cup speed while the suction cups are being loaded and at that time having mandrel spacing substantially exceed suction cup spacing. The loaded suction cups are then moved radially inward and are arranged in two rows on the transfer wheel. Now the cans are arranged generally in the same two row pattern as are the deco chain pins, with can spacing and linear can speed matching that of the deco chain pins.

Accordingly, the primary object of the instant invention is to provide an improved high-speed continuous motion can decorating apparatus as well as provide a novel method for operating this type of apparatus.

Another object is to provide improved apparatus of this type in which spacing between transfer wheel suction cups during loading thereof is substantially less than spacing between mandrels that are being unloaded and the latter is traveling faster than the suction cups.

Still another object is to provide improved apparatus of this type in which valves that control pressurized air for unloading mandrels are opened before the mandrels are aligned with suction cups that receive cans from these mandrels.

A further object is to provide improved apparatus of this type having means for automatically adjusting operational timing for valves that control introduction of pressurized air to the mandrels as a function of rotational speed for the mandrel carrier.

A still further object is to provide improved apparatus of this type in which decorated cans are unloaded from mandrels that are traveling in single file and are loaded on deco chain pins that are arranged in two rows.

Yet another object is to provide improved apparatus of this type in which suction cups are loaded while traveling in single file and the loaded suction cups are then arranged in a two row pattern with suction cup speed and spacing being equal to deco chain pin speed and spacing.

Other features and advantages of the present invention will become apparent from the following description of the invention which refers to the accompanying drawings.

BRIEF DESCRIPTION OF THE DRAWINGS

FIG. 3 is an enlarged fragmentary cross-section taken through line 3—3 of FIG. 2.

DETAILED DESCRIPTION OF THE DRAWINGS

As may be desired to amplify the following description, disclosures of U.S. Pat. Nos. 3,766,851 and 4,140,053 are incorporated herein by reference, as is the disclosure of the aforesaid U.S. Pat. No. 5,111,742. Now referring to the Figures and more particularly to FIG. 1 which illustrates continuous motion cylindrical container decorating apparatus of the general type described in the aforesaid U.S. Pat. No. 5,111,742.

Figure 1:
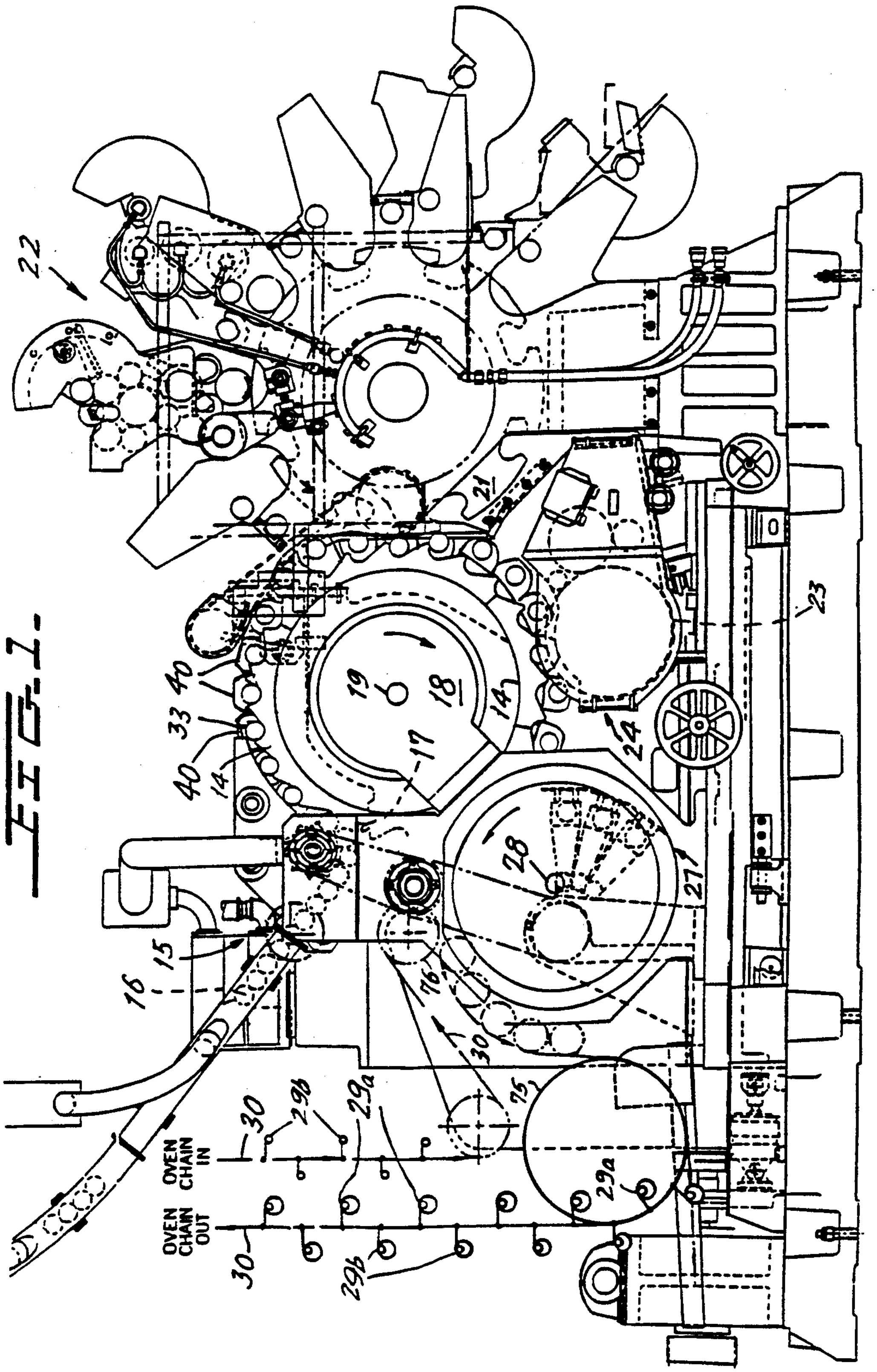
FIG. 1 is a side elevation of continuous motion can decorating apparatus constructed in accordance with teachings of the instant invention.
Figure 2:
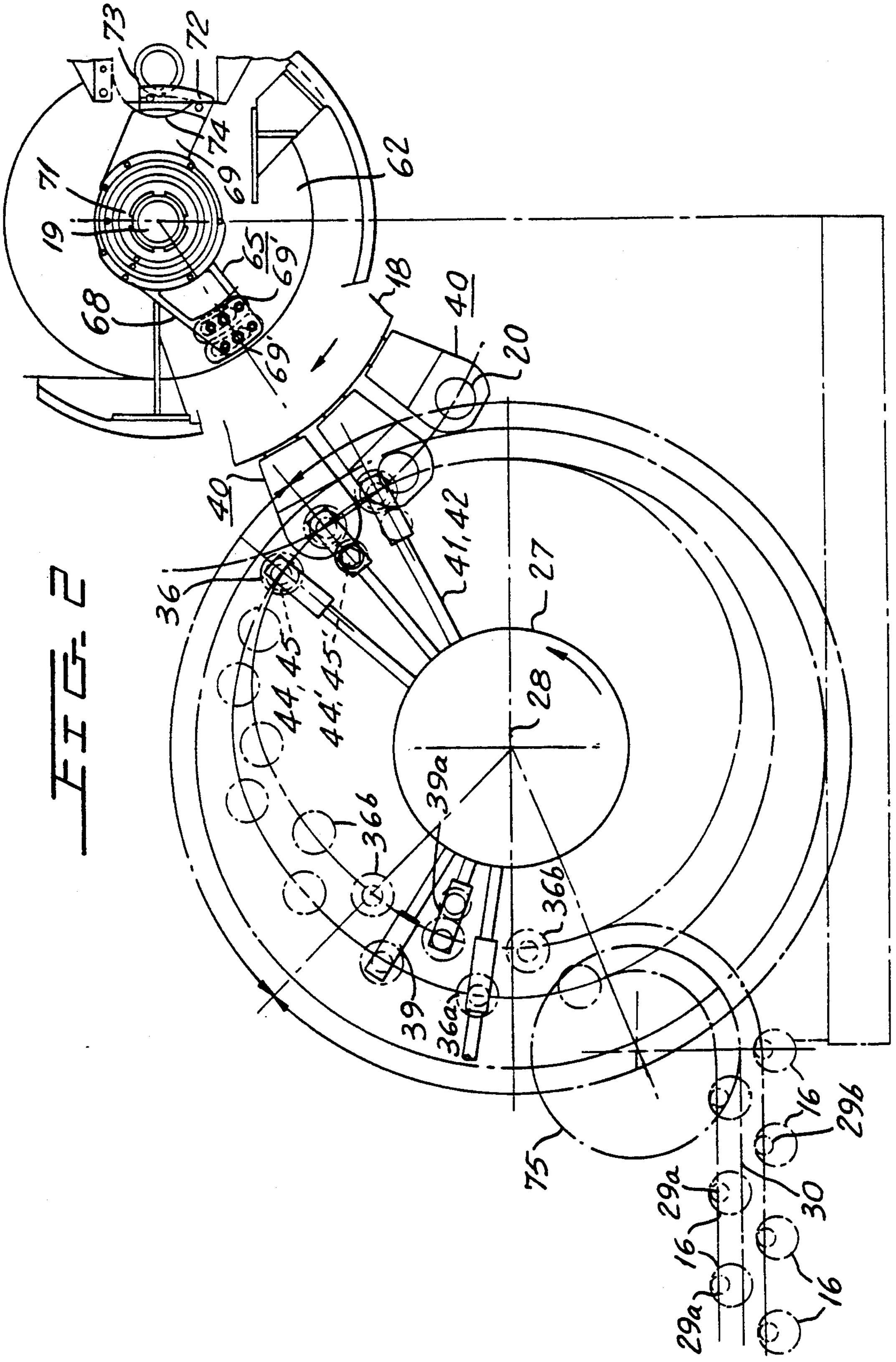
FIG. 2 is a fragmentary side elevation in schematic form of the transfer carrier wheel and major elements cooperating therewith.
Figure 7:
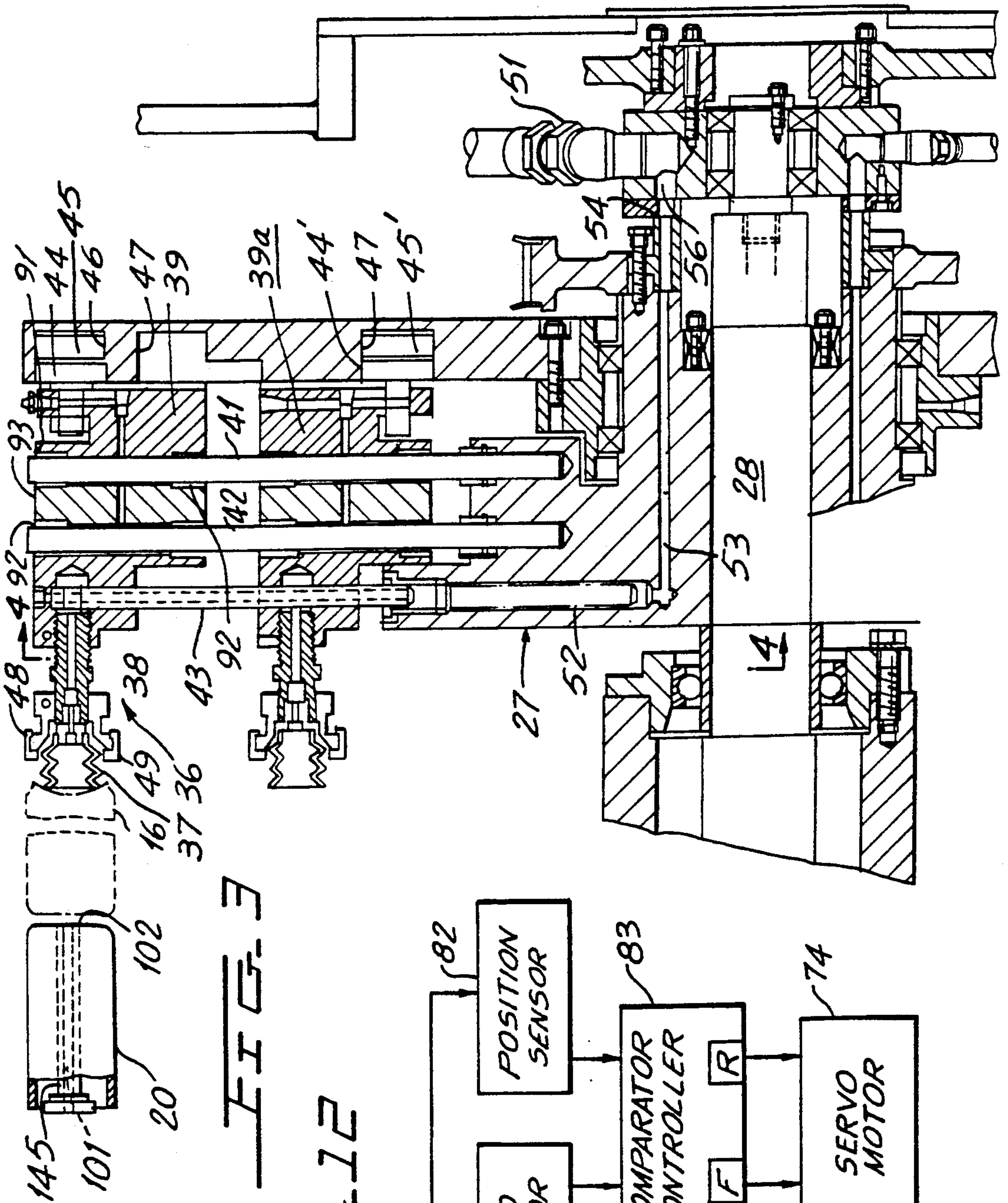
FIGS. 6, 7 and 8 are cross-sections taken through the respective lines 6—6, 7—7 and 8—8 of FIG. 5 looking in the directions of the respective arrows 6—6, 7—7 and 8—8.
Figure 12:
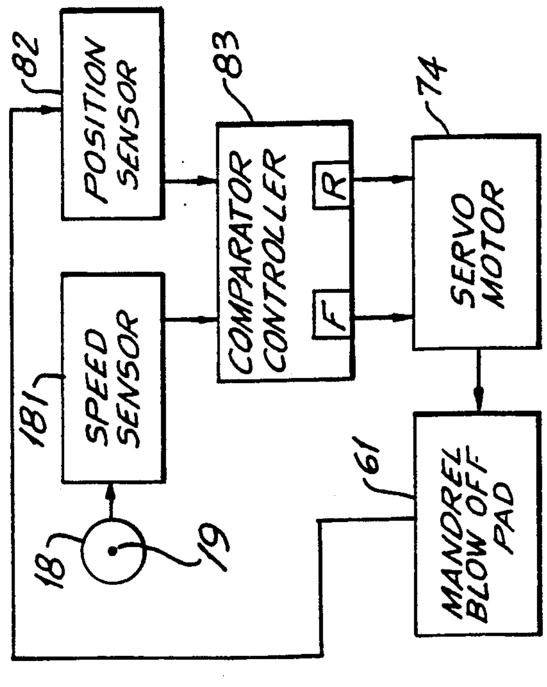
FIG. 12 is a block diagram of the means for automatically positioning the mandrel blowoff pad as a function of mandrel speed.

Briefly, the apparatus of FIG. 1 includes infeed conveyor chute 15 which receives undecorated cans 16, each open at one end thereof, from a supply (not shown) and places them in arcuate cradles or pockets 17 along a periphery of aligned spaced rings that are fixedly secured to wheel-like mandrel carrier 18 keyed to horizontal drive shaft 19. Horizontal spindles or mandrels 20, each part of an individual mandrel/actuator subassembly 40 (FIG. 2), are also mounted to wheel 18 with each mandrel 20 being in spaced horizontal alignment with an individual pocket 17 in a short region extending downstream from infeed conveyor 15. In this short region undecorated cans 16 are moved horizontally, being transferred from each cradle 17 to an individual mandrel 20. Suction applied through an axial passage 101 (FIG. 3) extending to the outboard or front end 102 of mandrel 20 draws container 16 to final seating position on mandrel 20. Each mandrel 20 should be loaded properly with a can 16 by the time mandrel 20 is in the proximity of sensor 33 which detects whether each mandrel 20 contains a properly loaded can 16. In a manner known to the art, if sensor 33 detects that a mandrel 20 is unloaded or is not properly loaded, then as this particular mandrel 20 passes through the decorating zone, wherein printing blanket segments 21 normally engage cans 16 on mandrels 20, this misloaded mandrel 20 is moved to a "no-print" position.

While mounted on mandrels 20, cans 16 are decorated by being brought into engagement with continuously rotating image transfer mat or blanket 21 of the multicolor printing press decorating section indicated generally by reference numeral 22. Thereafter, and while still mounted to mandrels 20, each decorated can 16 is coated with a protective film or varnish applied thereto by engagement with the periphery of applicator roll 23 in the overvarnish unit indicated generally by reference numeral 24. Cans 16 with decorations and protective coatings thereon are then transferred from mandrels 20 to holding elements or pickup devices, constituted by suction cups 36, while the latter are in single file along the periphery of transfer wheel 27 in a pickup region indicated by reference numeral 99 that is located between overvarnish unit 24 and the infeed of cans 16 to pockets 17. Transfer wheel 27 rotates about shaft 28 as a center and at transfer region 98 cans 16 carried by wheel 27 are deposited on generally horizontal, though upwardly projecting pins 29*a*, 29*b* extending from chain type output conveyor 30 which carries cans 16 through an oven (not shown) where the decorations and protective coating on these cans are cured. At opposite ends of transfer region 99 closed loop chain 30 is guided by relatively large sprockets 75, 76. Between sprockets 75, 76, a plurality of sprockets 77 (FIG. 11) guide chain 30 in an arcuate path that enables pins 29*a*, 29*b* to track suction devices 36*a*, 36*b*. In a manner known to the art, printing blanket 21, mandrel carrier 18, transfer wheel 27 and chain 30 are driven at speeds that bear predetermined relationships. Typically, there is a common main drive motor (not shown) to which these driven elements are connected mechanically.

Figure 9:
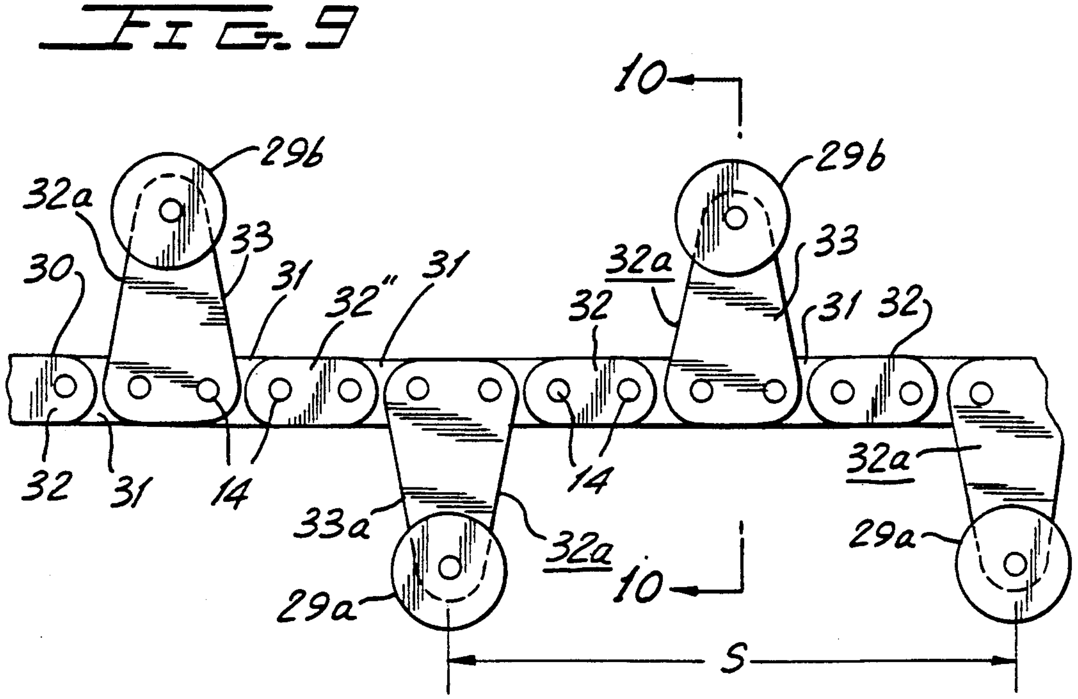
FIG. 9 is an enlarged fragmentary side elevation of a deco chain having two rows of pins, with the pins in each row being aligned in a direction parallel to the chain and the pins in adjacent rows being offset, hence in staggered relationship.
Figure 10:
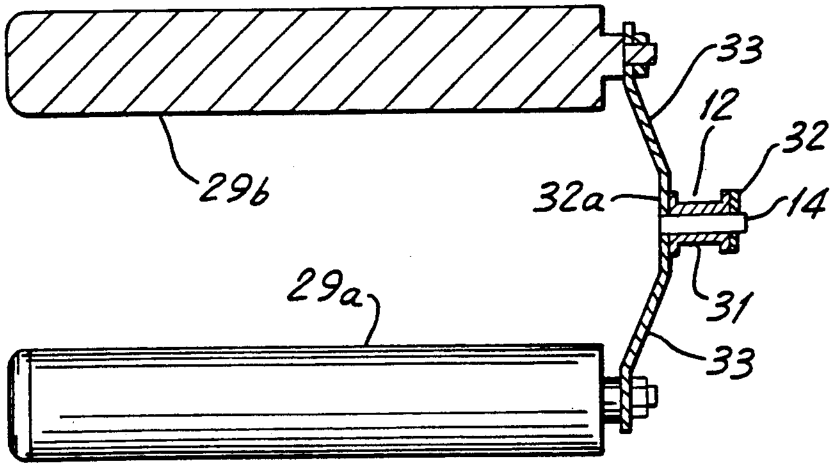
FIG. 10 is a cross-section taken through line 10—10 of FIG. 9 looking in the direction of arrows 10—10.

With particular reference to FIGS. 9 and 10 it is seen that chain 30 is constructed of two rows of staggered inner and outer links 31, 32 separated by spaced rollers 12 and are attached thereto by spindles 14. In one of the rows of links alternate ones of the outer links, designated 32*a*, are each provided with arm 33 that projects laterally of chain 30. One of the can receiving pins 29*a*, 29*b*, as the case may be, is mounted at the free end of each arm 33. Thus, spacing S between adjacent pins 29*a* in one row is equal to the spacing between adjacent pins 29*b* in the other row and pins 29*a* and 29*b* are equally spaced from chain 30, being disposed on opposite sides thereof and extending laterally in the same direction. As is well known to the art oven pins 29*a*, 29*b* are upwardly inclined slightly so that gravity is able to assist in operatively positioning and maintaining cans 16 on oven pins 29*a*, 29*b* as they travel through the curing oven (not shown).

Figure 11:
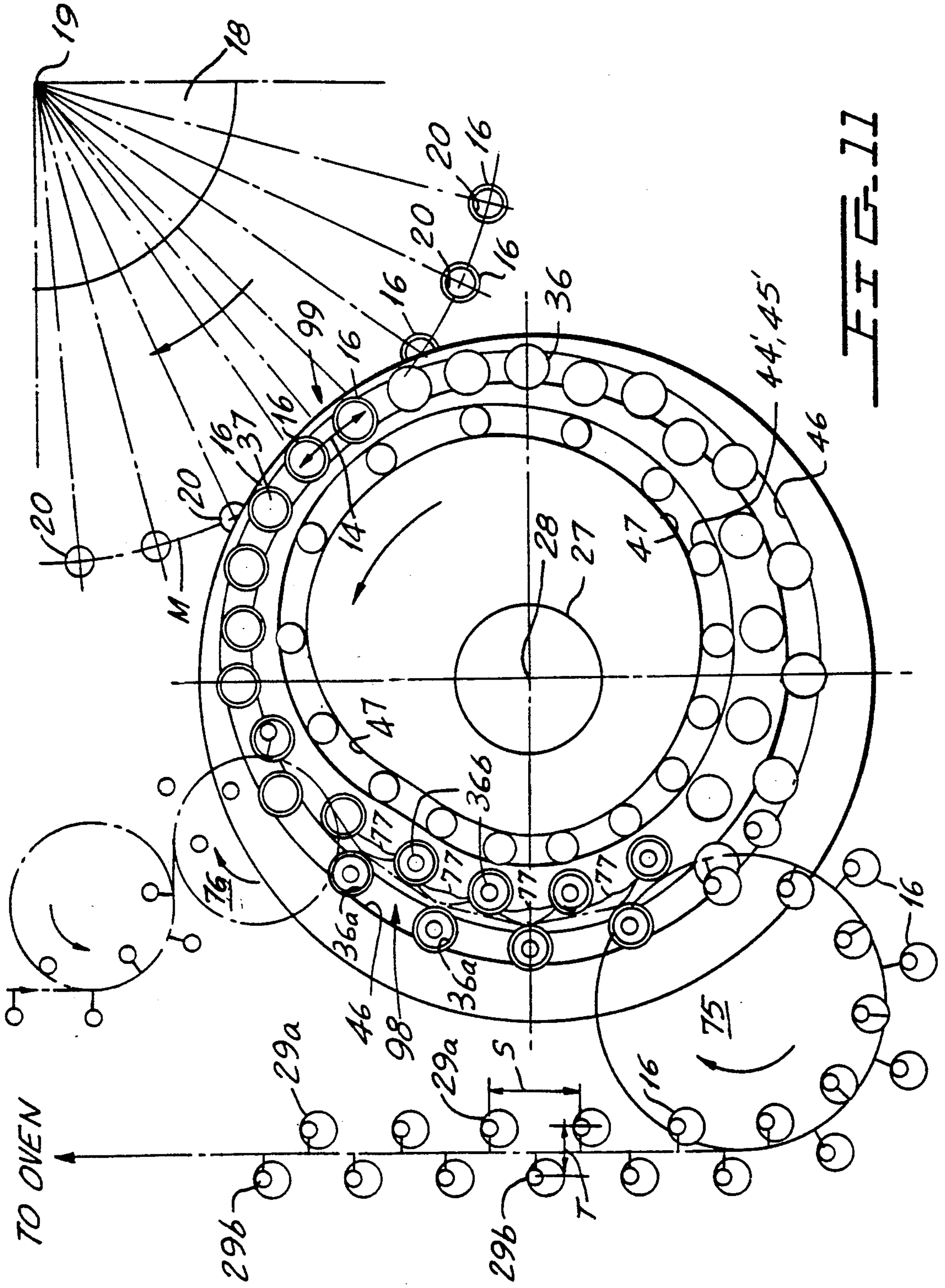
FIG. 11 is a schematic presented to simplify one's understanding of the construction and operation of the apparatus illustrated in the other Figs.

With reference to FIG. 11 it is seen that in pickup region 99 spacing M between the centers of adjacent mandrels 20 is considerably greater than spacing H between centers of adjacent suction holding devices 36. Typically, spacing M is 5.25 inches and spacing H is 4 inches. Further, in pickup region 99 the linear speed for mandrel 20 far exceeds the linear speed for suction holders 36.

While moving from pickup region 99 to transfer region 98, suction holding devices 36 move radially inward and are arranged in two rows that are spaced apart by a distance equal to spacing T between the two rows of pins on deco chain 30. At transfer region 98, suction holding devices 36*a*, 36*b* are travelling at linear speeds that are substantially less than the linear speed of suction holding devices 36 in pickup region 99. Further, spacing S between adjacent devices 36a equals substantially less than the spacing 2H between two devices 36 and this spacing between devices 36a is essentially the same as the spacing S between adjacent devices 29a. Further, devices 36a, 36b are traveling essentially at the same linear speeds as are the respective pins 29a, 29b. Typically, spacing S between adjacent pins 29a is 6" as compared to the 8" spacing between alternate suction pickup devices 36 in region 99. The foregoing dimensions are suitable for a construction in which there are thirty-six mandrels 20 and thirty-two suction holding devices 36.

Figure 4:
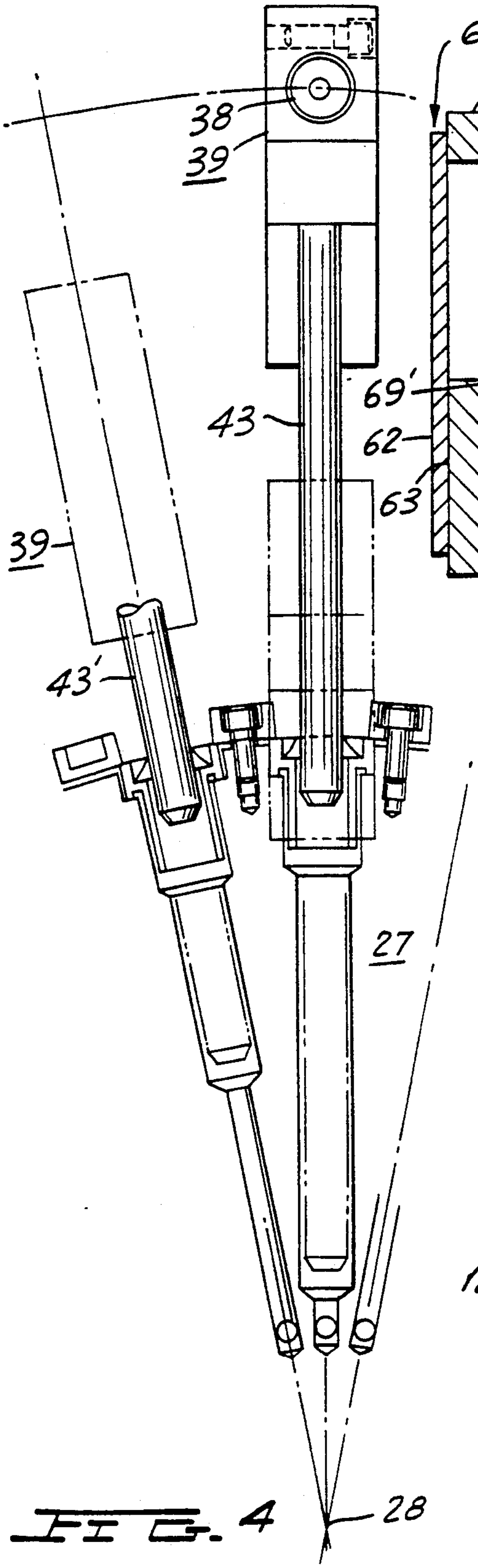
FIG. 4 is a front elevation in schematic form looking in the direction of arrows 4—4 of FIG. 3.

With respect to FIGS. 3 and 4, it is seen that each suction device 36 includes bellows type suction cup 37 mounted at the front end of hollow stub extension 38 that projects forward from support or carrier 39. Holding device carriers 39 are at equal angular spacings at the periphery of transfer wheel 27 being mounted thereto to reciprocate radially. That is, two guide rods 41, 42 extend radially outward from wheel 27. A third hollow rod 43 through which suction is applied to bellows 37 extends radially inward from carrier 39. Rods 41, 42 extend through passages in carrier 39 and are closely fitted to the respective slide bushings 91, 92.

Mounted to the rear of carrier 39 are two cam follower rollers 44, 45. For alternate ones of carriers 39 these rollers 44, 45 are mounted near the radially outboard surface 93 of block 39 and ride in outer closed loop cam track 46. For the remaining blocks 39a the cam follower rollers 44', 45' are mounted near the radially inboard surface of block 39a and ride in inner closed loop cam track 47. Hollow rods 43' that extend radially inward from carriers 39a that are positioned by inner cam track 47' are shorter that the guide rods 43 that extend radially inward from guide blocks 39 whose positions are controlled by outer cam track 46.

Mounted to hollow stub 38 and surrounding suction cup 37 near its point of securement to stub 38 is element 48 that provides stop surface 49. The latter limits movement of can 16 in a direction away from mandrel 20 as suction applied through stub 38 causes suction cup 37 to collapse. Suction applied at fitting 51 is applied to the radially inward end of transfer wheel bore 52 through axial passage 53 that extends to valving interface 54 and the short passage 56 in pickup region 99.

Figure 8:
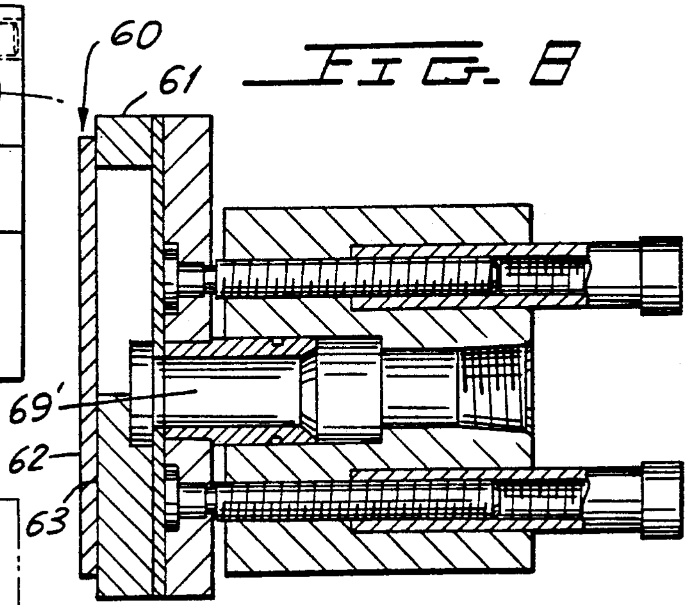
Figure 7:
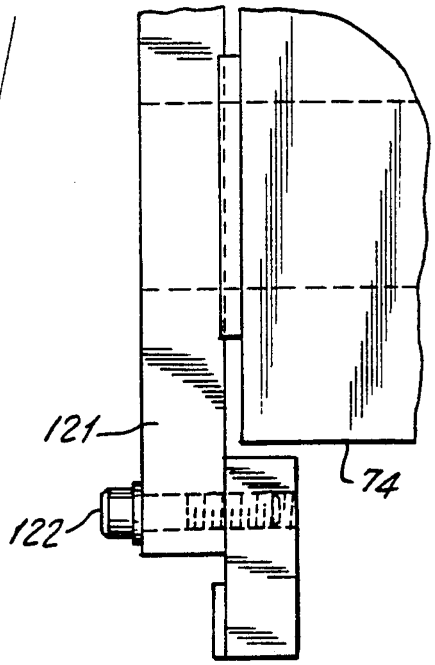
Figure 5:
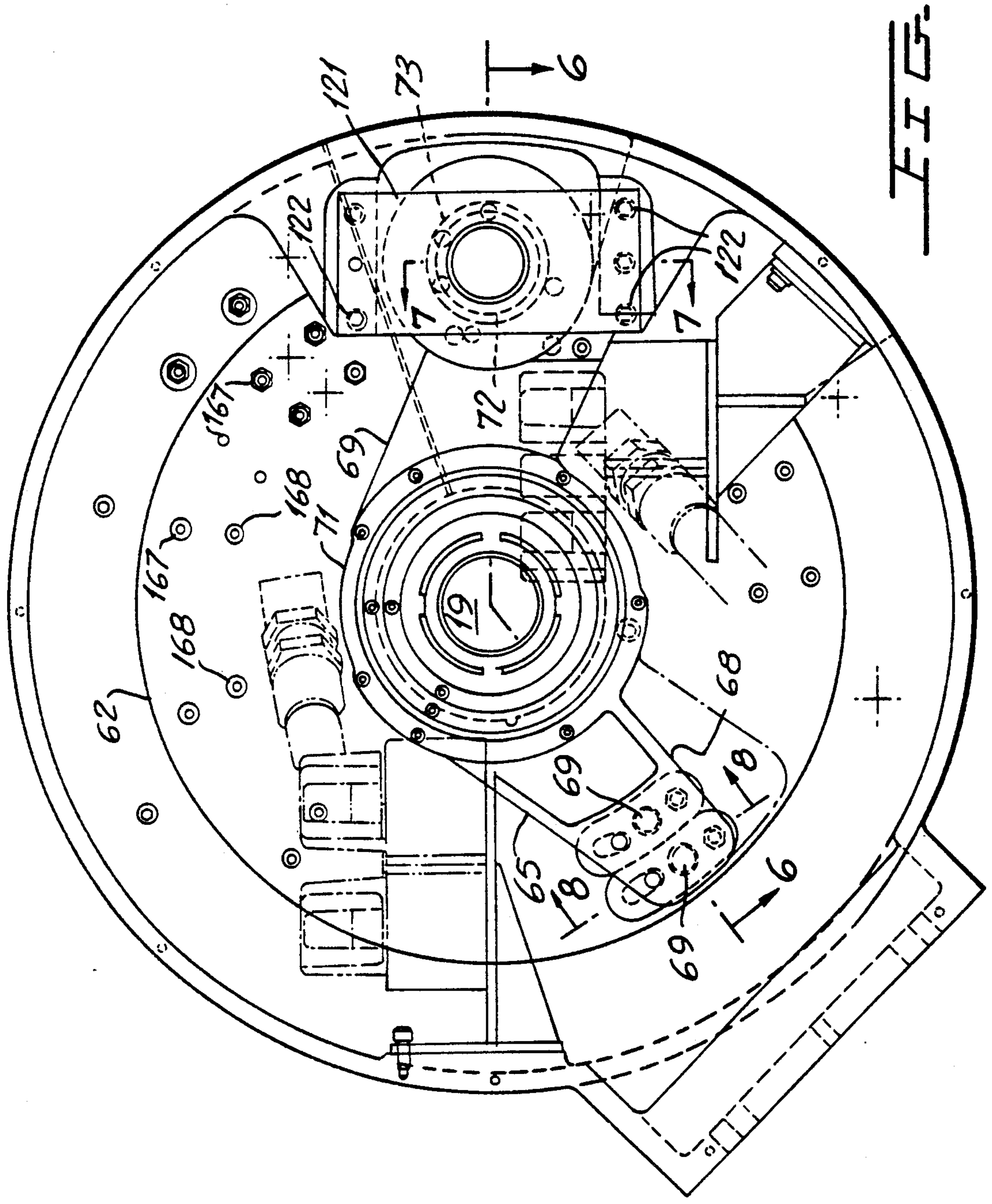
FIG. 5 is an enlarged layout of the automatically adjustable valve element that controls can blowoff from the mandrels.
Figure 6:
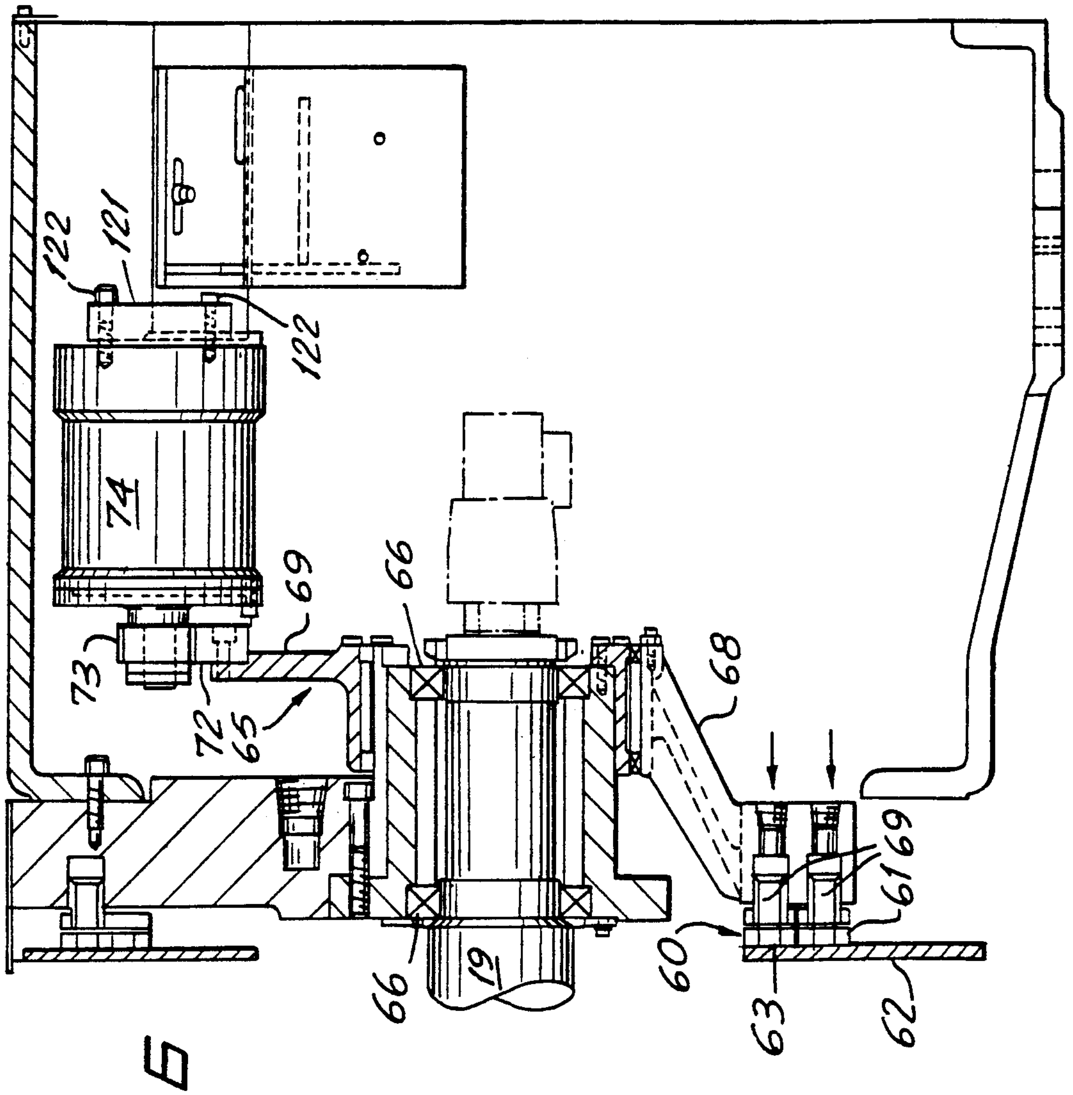

Decorated cans 16 are delivered from mandrels 20 to suction holding devices 36 on transfer carrier 27 by the application of pressurized air to mandrel 20. Control of valve 60 (FIG. 8) through which pressurized blowoff air is applied to mandrel 20 is a function of the angular position of mandrel 20 relative to the position of the receiving suction holding device 36 and the speeds at which the mandrel and transfer carriers 18, 27 are rotating. More particularly, because the spacing M between mandrels 20 is so much greater than the spacing H between the suction pickup devices 36 in pickup region 99 and in this region the linear speed of mandrels 20 substantially exceeds the linear speed of devices 36, transfer of a can 16 from a mandrel 20 to a holding device 36 is achieved by applying a positive blowoff force (pressurized air) through passage 101 of rotor extension 145 to appear at front end 102 of mandrel 20, whereby this blowoff force impinges upon the interior surface at the closed end of can 16. Application of this blowoff force occurs by opening control valve 60. However, application of this blowoff force to can 16 does not occur instantaneously upon opening valve 60. That is at high production speeds, there is substantial downstream movement of mandrel 20 between the time control valve 60 is opened to the time pressurized air impinges on can 16. Recognition of this fact brings one to the realization that by advancing operation of control valve 60 as mandrel speed increases results in synchronization of the blowoff force so that when a can 16 initially engages suction bellows 37 they are centered with respect to one another. In accordance with the instant invention mandrel blowoff force is synchronized with positions of the mandrel and a suction holding device 36 by appropriately positioning the relatively stationary element or mandrel blowoff pad 61 of valve 60 that also an individual includes movable valve element 62 for each mandrel 20. Element 62 is in sliding engagement with element 61 at interface 63. Relatively stationary valve element 61 is carried by adjustable V-shaped casting member 65 that is mounted at its apex 71 to mandrel carrier shaft 19 by bearings 66. For convenience, movable valve plate 62 that rotates with mandrel carrier 18 is provided with two concentric circular arrays of apertures 167, 168 (FIG. 5) and pad 61 is provided with two valving apertures 69'. One aperture 69' is used to feed pressurized air to alternate mandrels 20, each of which is connected to an individual aperture 167 in the outer array, and the other aperture 69' is used to feed the remaining mandrels 20, each of which is connected to an individual aperture 168 in the inner array.

Casting 65 includes angularly spaced radially extending arms 68, 69 projecting from hub 71 that surrounds shaft 19 at one end thereof. Adjustable valve pad 61 is mounted to arm 68 near its free end while the free end of arm 69 mounts sector gear 72 that is in engagement with pinion 73. The latter is driven by servo motor 74 that is secured to plate 121 which is fastened by four screws 122 to the main frame of the apparatus. Servo motor 74 operates in accordance with signals received from comparator/controller 83. The latter is programmed to produce output signals in accordance with outputs from sensors 81 and 82. Sensor 81 monitors mandrel speed. In particular, as mandrel speed increases relatively stationary valve element 61 is moved further upstream so that pressurized air is released through valve 60 in time to reach the closed end of can 16 while it is appropriately positioned with respect to suction bellows 37. The known quantity involved in this operation is the distance from valve interface 63 to free end 102 of mandrel 20. Knowing this distance one is able to calculate the time that it takes pressurized air to appear at free end 102 of mandrel 20 after valve 60 opens, and knowing this time and knowing the rotational speed of mandrel carrier 18 enables one to calculate the distance that a mandrel will travel from the time valve 60 opens and the time the blowoff force is initially applied to can 16. The angular position of the receiving suction cup 36 is known for each angular position of the loaded mandrel 20. Knowing the foregoing enables one to calculate the angular position of a loaded mandrel 20, at which its associated valve aperture 167 or 168 in movable valve element 63 is opposite a valve aperture 69' in relatively stationary pad 61 so that the required angular position for the latter becomes known and servo motor 74 operates to drive pad 61 to this required position.

Thus, it is seen that the instant invention provides a practical means for transferring decorated cans from very rapidly moving widely spaced mandrels arranged in single file to oven pins that are carried by a relatively slow moving deco chain and arranged relatively closed together in two rows along opposite sides of the chain.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for loading cylindrical containers onto pins from mandrels on a continuously rotating mandrel carrier that moves said containers in a single file at a substantially faster linear speed than said pins are moving, with each of said containers having a closed end and an open end, said pins being carried by a continuously moving chain and being arranged in first and second rows of pins; said method including the steps of:

delivering said containers from said mandrels to holding elements on a continuously rotating transfer carrier with said closed ends operatively engaging said holding elements by moving said mandrels in single file through a pickup region, moving said holding elements in single file through said pickup region at a linear speed substantially slower than the linear speed of said mandrels, and in said pickup region arranging spacing between adjacent ones of said elements to be substantially less than spacing between adjacent ones of said mandrels;

driving containers from the mandrels to said holding elements by timed application of pressurized air through the mandrels to the interior sides of said closed ends of said containers, with pressurized air being introduced to each of said mandrels at its end remote from the closed end of the container mounted thereon; and as a function of mandrel speed, automatically controlling operation of valve means through which pressurized air is introduced to each of said mandrels, with the position where pressurized air is introduced to each of said mandrels by said valve means being at a more upstream position as mandrel carrier speed increases;

then delivering said containers form said holding elements to said pins by moving said containers through a transfer region located downstream of said pickup region, said containers being entered through their said open ends by said pins and thereby being received by said pins as the latter move through said transfer region.

2. A method for loading cylindrical containers as set forth in claim 1 in which each of said holding elements is a suction device that includes a container engaging collapsible bellows.

3. A method for loading cylindrical containers as set forth in claim 2 in which said containers engage said bellows before clearing said mandrels.

4. A method for loading cylindrical containers as set forth in claim 1 in which the valve means includes a relatively stationary common pad in sliding engagement with a rotating valve member.

5. A method for loading cylindrical containers as set forth in claim 4 in which servo means is utilized to drive said pad to its required position.

6. Apparatus for decorating cylindrical articles, said apparatus including:

a carrier mounted for continuous rotation on a main axis;

a plurality of equally angularly spaced mandrels mounted on said carrier and arranged in an array surrounding said main axis;

decorating means past which said mandrels move as said carrier rotates;

a transfer carrier mounted for continuous rotation about an axis;

a plurality of pickup devices mounted on said transfer carrier in an array surrounding its rotational axis and adapted to receive articles directly from said mandrels when said pickup devices and said mandrels move through a pickup zone;

a closed loop continuously moving oven chain;

a plurality of pins mounted to said oven chain, spaced along the length thereof and adapted to extend into said articles to receive same directly from the pickup devices;

the spacing between adjacent mandrels being substantially greater than the spacing between adjacent pickup devices while they are moving through said pickup zone;

the linear speed of said mandrels being substantially greater than the linear speed of said pickup devices while they are moving through said pickup zone;

valve means through which pressurized air si applied to said mandrels to drive articles thereon toward the pickup devices;

means for controlling timed application of pressurized air to said mandrels while they move through said pickup zone to drive decorated articles from said mandrels to be received by said pickup devices while the latter move in single file through said pickup zone;

said means for controlling including means for automatically controlling operation of said valve means as a function of mandrel speed, with pressurized air being applied to said mandrels at more upstream positions thereof as mandrel speed increases.

7. Apparatus for decorating cylindrical articles as set forth in claim 6 in which the valve means includes a relatively stationary common pad in sliding engagement with a rotating valve member that is connected to the carrier and is provided with individual port means for each of said mandrels;

said means for automatically controlling operation of said valve means comprising means for automatically repositioning said common pad as a function of mandrel carrier speed.

8. Apparatus for decorating cylindrical articles as set forth in claim 7 in which the means for automatically positioning the common pad moves the latter upstream as mandrel carrier speed increases and moves the common pad downstream as mandrel carrier speed decreases.

9. Apparatus for decorating cylindrical articles as set forth in claim 8 in which the means for automatically positioning the common pad includes a servo.

* * * * *